US007748131B2

(12) United States Patent
Finkenwirth et al.

(10) Patent No.: US 7,748,131 B2
(45) Date of Patent: Jul. 6, 2010

(54) METHOD OF INSPECTING GEARS DURING THEIR MANUFACTURE

(75) Inventors: Klaus Finkenwirth, Aitrang (DE); Andreas Mehr, Ermengerst (DE)

(73) Assignee: Liebherr-Verzahntechnik GmbH, Kempten/Allgaeu (DE)

(*) Notice: Subject to any disclaimer, the term of this patent is extended or adjusted under 35 U.S.C. 154(b) by 278 days.

(21) Appl. No.: 11/920,470

(22) PCT Filed: May 18, 2006

(86) PCT No.: PCT/EP2006/004735

§ 371 (c)(1),
(2), (4) Date: Nov. 21, 2007

(87) PCT Pub. No.: WO2006/122812

PCT Pub. Date: Nov. 23, 2006

(65) Prior Publication Data

US 2009/0064518 A1   Mar. 12, 2009

(30) Foreign Application Priority Data

May 18, 2005   (DE) ............... 10 2005 022 863

(51) Int. Cl.
*G01B 5/20* (2006.01)

(52) U.S. Cl. ............... 33/501.13; 33/501.7; 33/501.15; 73/162

(58) Field of Classification Search ... 33/501.7–501.19; 73/162, 118.1, 593
See application file for complete search history.

(56) References Cited

U.S. PATENT DOCUMENTS

| 4,276,699 | A | * | 7/1981 | Sterki et al. | 33/501.9 |
| 4,276,700 | A | * | 7/1981 | Tanno et al. | 33/501.9 |
| 4,488,359 | A | * | 12/1984 | Misson | 33/501.8 |
| 4,610,091 | A | * | 9/1986 | Bertz et al. | 33/501.15 |
| 4,646,443 | A | * | 3/1987 | Hofler | 33/501.15 |
| 4,706,360 | A | * | 11/1987 | Callens et al. | 33/554 |
| 4,831,872 | A | * | 5/1989 | Huang et al. | 73/162 |
| 4,852,402 | A | * | 8/1989 | Bertz | 73/162 |
| 4,931,949 | A | * | 6/1990 | Hernandez et al. | 702/35 |
| 5,373,735 | A | * | 12/1994 | Gutman | 73/162 |
| 5,392,644 | A | * | 2/1995 | Frazier | 73/162 |
| 7,401,415 | B2 | * | 7/2008 | Musuraca | 33/501.7 |
| 2007/0058854 | A1 | * | 3/2007 | Caskey et al. | 382/152 |
| 2008/0270070 | A1 | * | 10/2008 | George et al. | 33/501.8 |
| 2009/0019927 | A1 | * | 1/2009 | Tobisawa et al. | 73/162 |

FOREIGN PATENT DOCUMENTS

| DE | 1258609 | | 1/1968 |
| DE | 4305408 | | 8/1994 |
| FR | 2606307 | | 5/1988 |
| JP | 61131821 A | * | 6/1986 |
| JP | 03065601 A | * | 3/1991 |
| JP | 2002004030 A | * | 1/2002 |

* cited by examiner

*Primary Examiner*—Yaritza Guadalupe-McCall
(74) *Attorney, Agent, or Firm*—Alleman Hall McCoy Russell & Tuttle LLP

(57) ABSTRACT

The invention relates to a method of inspecting gears during their manufacture in the gear cutting machine, wherein the respective workpiece is traveled to by the tool at specific reference points to determine any deviations. The setting of the tool can be corrected by means of these deviations via a control loop.

19 Claims, 1 Drawing Sheet

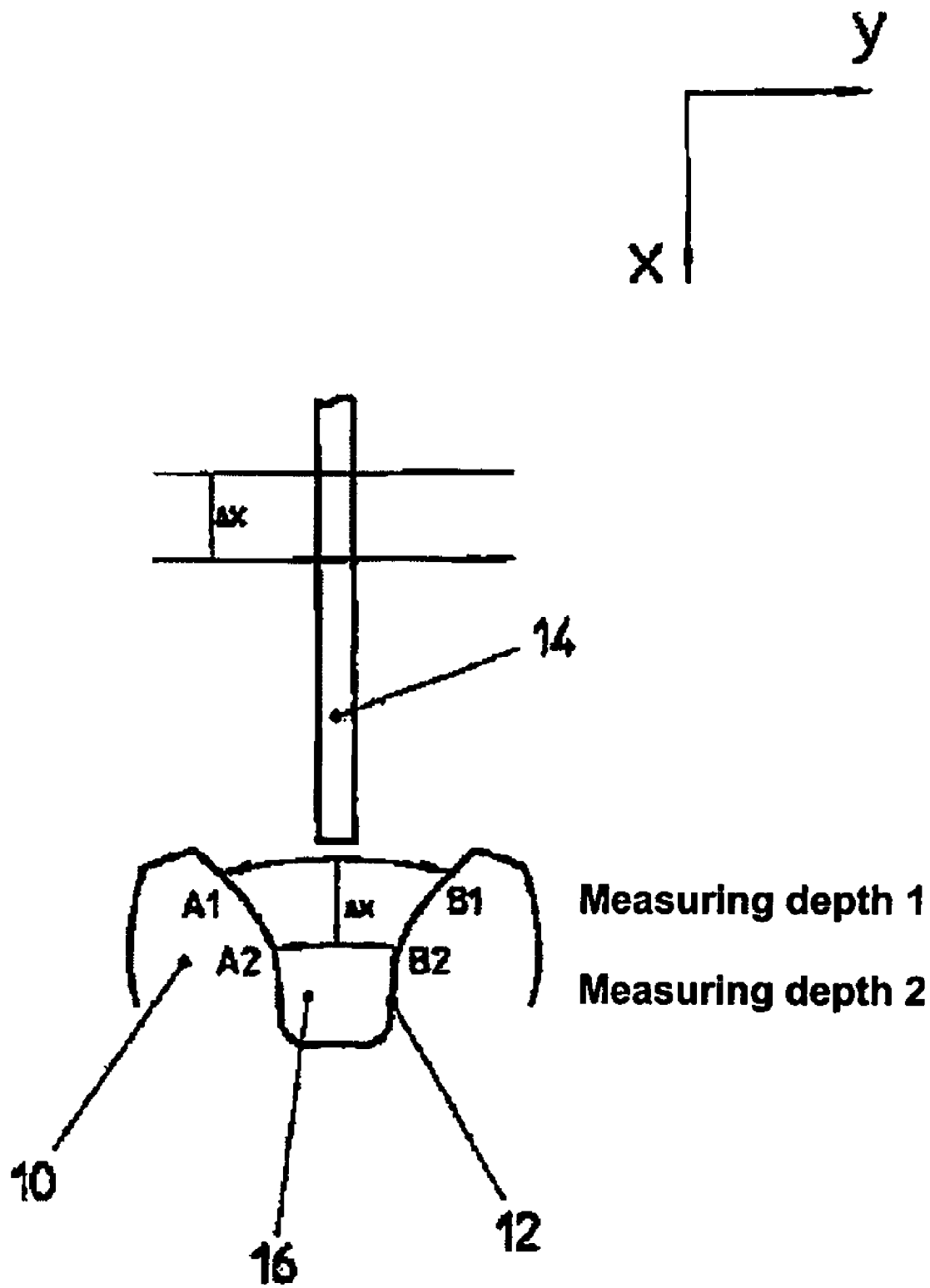

METHOD OF INSPECTING GEARS DURING THEIR MANUFACTURE

CROSS-REFERENCE TO RELATED APPLICATIONS

This is the U.S. national phase of International PCT Application Serial No. PCT/EP2006/004735 filed May 18, 2006, which in turn claims priority to German Patent Application No. 10 2005 022 863.1 filed May 18, 2005, both of which applications are hereby incorporated by reference in their entirety for all purposes.

BACKGROUND

The invention relates to a method of inspecting gears during their manufacture in a gear cutting machine.

In addition to numerous inspection criteria, one of the most important is the determination of the dimension over balls since a decision can be made by means of the dimension over balls whether the gear produced is a good part or a reject. The check of the dimension over balls and, optionally, a machine correction associated therewith are an absolute necessity for a reliable production. The determination of the dimension over balls is standardized by DIN 3960. It is a diametric test dimension for the tooth thickness.

The dimension over balls of gears is checked randomly in production. If the inspection level is increased, i.e. if the number of workpieces to be inspected is increased, the metrological and time efforts, and naturally also the costs associated therewith, increase. A number of measuring systems are generally available for the determination of the dimension over balls, with the spectrum usual in practice ranging from simple hand measuring instruments with micrometer screws to automated measuring systems in and on the machine and to 3D gear cutting measuring machines in air-conditioned measuring rooms. On a corresponding determination of the dimension over balls, the gear to be inspected must therefore in each case be removed from the gear cutting machine and measured in the measuring room before any corrections required can be made to the setting of the gear cutting machine.

If a corresponding deviation of the dimension over balls was found in a measured workpiece, it is possible in commercial gear cutting machines to exactly achieve the dimension over balls by corresponding setting parameters or machining parameters on individual workpieces. Furthermore, most machines provide a manual or automatic correction function to react to fluctuations in dimension and thus to keep the process as stable as possible. Primarily the thermal behavior of the machines and the tool wear are to be named as the causes for the fluctuations in dimension and/or the deviations.

The following problems result from the aforesaid procedure: on a measurement of the dimension over balls in an air-conditioned measuring room especially provided for this purpose, the problem arises that the measured result obtained cannot be traced back close to production. A long reaction time is hereby caused for the necessary corrective action. The changed clamping situation may result in measuring errors in grinding/milling and in measurement. If the gear is measured using sensors or styluses, the tool wear is not taken into account and, ultimately, tool changes due to dressing processes of the tool are also not exactly determined and thus enter into the measured result, and thus into the dimensional correction, as an error.

SUMMARY

It is now the object of the present invention to provide a method of inspecting gears during their manufacture in which the check takes place in as automatic a manner as possible, with simultaneously an automatic correction of the desired state being made possible.

This object is solved by a method of inspecting gears during their manufacture in the gear cutting machine in accordance with the invention with the following steps: traveling the tool into an existing tooth gap at a predetermined reference point of the tooth flank, determining the gap width by tangentially moving the tool tooth in the tooth gap, or vice versa, calculating the base tangent length, determining the difference between the actual and the theoretical base tangent length, and calculating the center distance error from the previously determined difference.

Accordingly, the determined center distance error can be traced back to the control of the gear cutting machine in a control loop to correct the center distance error by the control.

The tool can be traveled to a reference point at specific points in time. If deviations should be found here, they are due to wear of the tool. These deviations can likewise be compensated by the control.

A clamped gear which was previously determined in the dimension over balls by means of an independent measurement can serve as the reference point. Alternatively, a reference gap of known dimension assigned in the tool machine can serve as a reference point. The number of the inspection points automatically moved to in the gear cutting machine can be selected statistically. Measurements can in particular be made more frequently during the start up of the gear cutting machine, in which pronounced deviations occur due to the thermal change, than in the run-in condition.

The dimension over balls of gears can be detected directly with the help of the tool using the method in accordance with the invention and the deviations from the desired condition can be corrected automatically. Dimensional deviations due to the machine can be corrected in a simple manner by a correspondingly selected measurement strategy. The method in accordance with the invention can advantageously be used in milling and grinding. In grinding, dressable and non-dressable grinding tools can be used. In the latter case, as previously shown, the reference of the tool position can take place by last identical parts after the dressing. The zero adjustment of the tool can, however, also be set by means of a reference gap. The method cannot only be used for the tool and workpiece with usual milling conditions, but also with a dressing wheel with which a screw is machined, for example.

BRIEF DESCRIPTION OF THE FIGURE

Further details and advantages of the invention result from the measurement strategy explained with reference to the enclosed sketch.

DETAILED DESCRIPTION

A part of a gear is marked by 10 which has a tooth flank 12 in the form of an involute. The tooth flanks 12 of the gear 10 are machined by means of a tool 14, for example a grinding wheel or a spiral. Two measuring depths are indicated within the tooth gap 16, namely the measuring depth 1 and the measuring depth 2. Due to the shape of the tooth flanks 12, it applies to the measuring depth 1 that the spacing between A1 and B1 is larger than the spacing between the points A2 and B2 in the measuring depth 2. Since the spacing from the gap center of the tooth gap 16 is known at every point on the involute, the radial delivery amount of the tool of measuring depth 1 and measuring depth 2, namely Δx, is known. Δx corresponds to the center distance error of the tool 14 which can be determined by the inspection measurement of the spacing of the tooth flanks and the determined deviation from a predetermined desired value.

The invention claimed is:

1. A method of inspecting gears during their manufacture in a gear cutting machine having a tool, comprising the following steps:
    traveling the tool of the gear cutting machine into an existing tooth gap at a predetermined reference point of a tooth flank;
    determining a gap width by tangentially moving the tool tooth in the tooth gap, or vice versa;
    calculating an actual base tangent length based on the determined gap width;
    determining a difference between an actual and a theoretical base tangent length; and
    calculating a center distance error from the previously determined difference.

2. The method in accordance with claim 1, wherein the distance error is traced to control of the gear cutting machine in a control loop, and the distance error is corrected by the control.

3. The method in accordance with claim 2, wherein the tool is traveled to the reference point at predetermined points in time.

4. The method in accordance with claim 3, wherein a distance error caused by wear of the tool is compensated by the control.

5. The method in accordance with claim 4, wherein a clamped gear whose dimension over balls was previously determined by an independent measurement serves as the reference point.

6. The method in accordance with claim 3, wherein inspection intervals are selected statistically.

7. The method in accordance with claim 6, wherein the inspection intervals are selected to be shorter during a start up of the gear cutting machine than in a run-in state.

8. The method in accordance with claim 1, wherein a reference gap of known dimensions arranged in the machine tool serves as the reference point.

9. The method in accordance with claim 1, wherein the center distance error is traced to control of the gear cutting machine in a control loop, and in response the center distance error is automatically corrected by the control.

10. A method of manufacturing gears with a gear cutting tool, comprising:
    periodically inspecting a gear, the inspection including:
        traveling the gear cutting tool into an existing tooth gap at a predetermined reference point of the tooth flank, wherein the gear cutting tool is traveled to a reference point at predetermined points in time;
        generating tangential relative motion between the tool tooth and the tooth gap to determine a gap width;
        calculating a base tangent length based on the determined gap width;
        determining a difference between the calculated base tangent length and a theoretical base tangent length;
        calculating a center distance error from the determined difference; and
        adjusting operation of the gear cutting machine via a control loop to correct the center distance error.

11. The method in accordance with claim 10, wherein the gear cutting tool is traveled to the reference point at predetermined points in time.

12. The method in accordance with claim 11, wherein inspection intervals of the periodic inspections are selected based on statistics.

13. The method in accordance with claim 11, wherein inspection intervals of the periodic inspections are shorter during a start up of the gear cutting machine than in a run-in state.

14. The method in accordance with claim 10, wherein the adjusting is carried out automatically.

15. A method of manufacturing gears with a gear cutting tool, comprising:
    periodically inspecting a gear, where inspection intervals of the periodic inspections are shorter during a start up of the gear cutting machine than in a run-in state, the inspection including:
        traveling the gear cutting tool into an existing tooth gap at a predetermined reference point of the tooth flank;
        generating tangential relative motion between the tool tooth and the tooth gap to determine a gap width;
        calculating a base tangent length based on the determined gap width;
        determining a difference between the calculated base tangent length and a theoretical base tangent length;
        calculating a center distance error from the determined difference; and
        adjusting operation of the gear cutting machine via a control loop to correct the center distance error.

16. The method in accordance with claim 15, wherein a clamped gear whose dimension over balls was previously determined by an independent measurement serves as the reference point.

17. The method in accordance with claim 15, wherein a reference gap of known dimensions arranged in the machine tool serves as the reference point.

18. The method in accordance with claim 15, wherein the adjusting is carried out automatically.

19. The method in accordance with claim 15, wherein the periodically inspecting is carried out during milling and grinding of the gear.

* * * * *